Nov. 26, 1957  D. R. DAYKIN  2,814,442
COUNTER FOR SHAFT POSITION INDICATOR
Filed July 14, 1953  5 Sheets-Sheet 1

INVENTOR.
DONALD R. DAYKIN
BY Geoffrey Knight
ATTORNEY.

Nov. 26, 1957  D. R. DAYKIN  2,814,442
COUNTER FOR SHAFT POSITION INDICATOR
Filed July 14, 1953  5 Sheets-Sheet 2

INVENTOR.
DONALD R. DAYKIN
BY Geoffrey Knight
ATTORNEY.

Nov. 26, 1957     D. R. DAYKIN     2,814,442
COUNTER FOR SHAFT POSITION INDICATOR
Filed July 14, 1953     5 Sheets-Sheet 3

INVENTOR.
DONALD R. DAYKIN
BY
ATTORNEY.

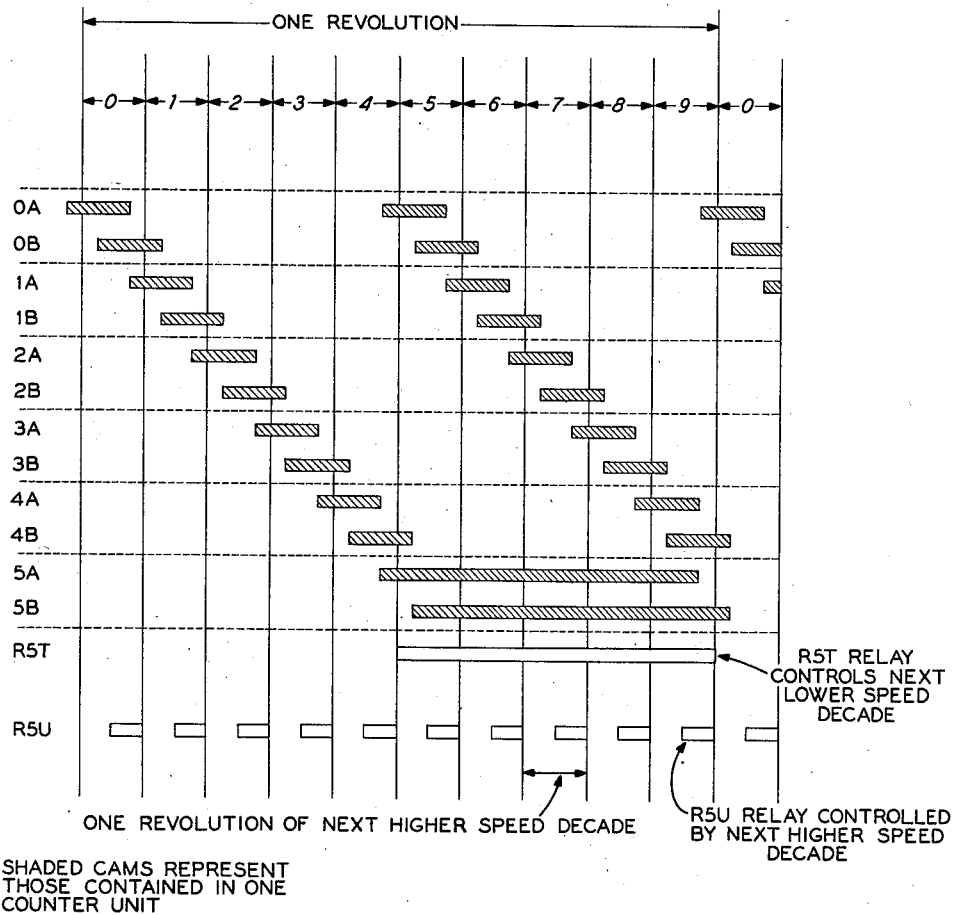

United States Patent Office 2,814,442
Patented Nov. 26, 1957

2,814,442
COUNTER FOR SHAFT POSITION INDICATOR

Donald R. Daykin, Endicott, N. Y., assignor to International Business Machines Corporation, New York, N. Y., a corporation of New York Application July 14, 1953, Serial No. 367,948

9 Claims. (Cl. 235—92)

This invention relates to a counter mechanism for shaft position indicating or recording devices. More particularly, it relates to a counter having mechanical drive and electrical readout and consisting of a number of individual counters geared together, with speed reduction between counters corresponding to the system of notation used.

Geared counters of the type referred to have certain known advantages, such as freedom from sudden torque loads at time of carry; ability to retain correct position even if power is switched on or off; ability to rotate forward or backward and thus to add or subtract; etc.

They present a problem, however, in reading out their position, because of ambiguity at the breaks between adjacent digit positions. If, for example, an ordinary brush and commutator type of readout is used the brush may make contact with segments pertaining to two adjacent digits at the same time.

A primary object of my invention is, accordingly, to provide a counter of the type described in which there is no possibility of ambiguity in the readout.

Another object is to provide a counter of the type described requiring no high precision parts and having low wear.

Another object is to provide a counter of the kind referred to occupying a small space.

Still another object is to provide such a counter adapted to be made up in any desired capacity by assembling together similar units.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 7 is a timing diagram of the counter shown in Fig. 6.

Figure 1:
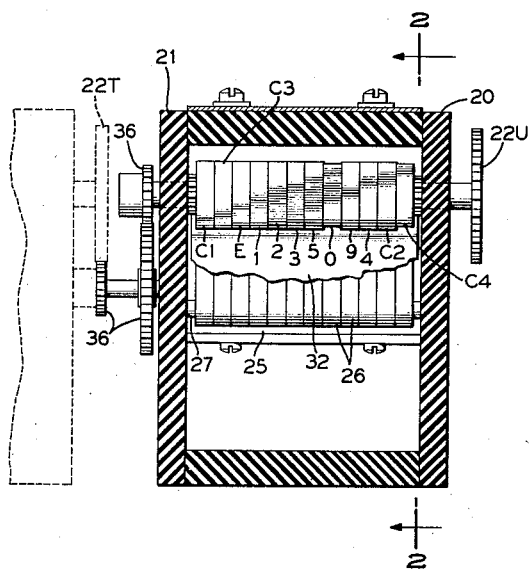
Fig. 1 is a longitudinal vertical sectional view parallel to the shaft, of a single denominational order counter embodying my invention and showing its relation to an adjacent counter. The section is taken approximately on the line 1—1 of Fig. 2.

The invention will be explained by reference to an illustrative embodiment employing relay switching means. Such a counter can be used where readout takes place intermittently with the shaft stationary. By a slight change in the circuit it can be made to readout continuously at moderate shaft speeds, say up to 240 R. P. M. By the use of electronic switching means continuous readout can be handled with considerably higher shaft speeds. The time limitations are imposed by the time required for the ripple type carry controls which will be described later.

The illustrative embodiment of the invention shown in the drawing is a multi-order counter each order of which is a separate unit, the counter being assembled by setting up side-by-side as many units as are required for the desired capacity. All of the single order counters, except the lowest order, are the same. The lowest order counter resembles the others in general, but has certain differences which will be pointed out.

Lowest order counter

Figure 2:
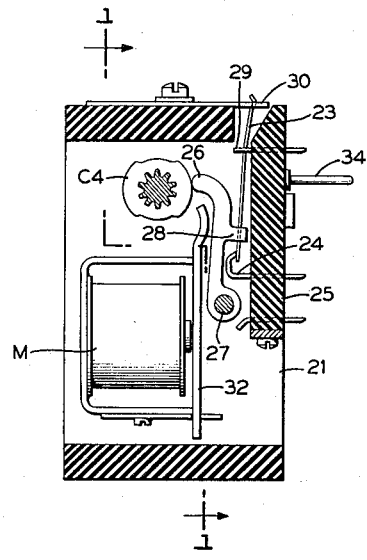
Fig. 2 is a section at right angles to Fig. 1, taken approximately on the line 2—2 of Fig. 1.

The mechanical features of the single order counters, as seen in Figs. 1 and 2, are the same for all orders. Due to certain differences in reference numbers, the counter shown in these figures will be described as a lowest order counter. It comprises a box-like frame made up of moldings of plastic insulating material. Across two side walls 20 and 21 of the frame extends a shaft 22U, which is driven by the shaft (not shown) whose angular position is to be indicated. The counter shown being designed for the decimal scale, shaft 22U has a series of 12 cams keyed upon it, respectively identified as C1, C3, E, 1, 2, 3, 5, 0, 9, 4, C2 and C4. For each cam there is a contact consisting of a flexible wire 23 and a stationary wire 24 rigid in the back wall 25. For each flexible contact wire 23 there is a contact operating lever 26 rockably mounted upon a stationary shaft 27 extending between the side plates 20 and 21. The contact operating lever has a slotted boss 28 through which the flexible wire contact 23 is threaded. The wire is also threaded through holes in a stationary insert 29 and an adjustable plate 30, the adjustment of the latter being such as to impart a bow to the wire, tending to rock the contact operating lever counterclockwise (Fig. 2).

The contact operating levers 26 bear upon the respective cams C1 to C4, under the pressure of their related contact wires 23. However, a retracting bail 32, which extends across all of the contact operating levers and which is normally urged toward the right in Fig. 2 by a spring, not shown, holds the contact operating levers clear of the cams, when in its normal position. Fig. 2 shows the retracting bail in the position it assumes when attracted by a readout magnet M. In this position of the retracting bail it is clear of the contact operating levers, which rest upon their respective cams. Depending upon whether a contact operating lever rests upon a high dwell or a low dwell of its cam, the contact wire 23 will touch, or will not touch, the related stationary contact 24.

The counter unit is adapted to be mounted upon a panel (not shown) by means of a pin 34, and also by the extending ends of the inserts 24 and 29, which are adapted to be received in contact socket members on the panel. The latter contact members provide circuit connection to the wire and stationary contact elements, 23 and 24.

Figure 3:
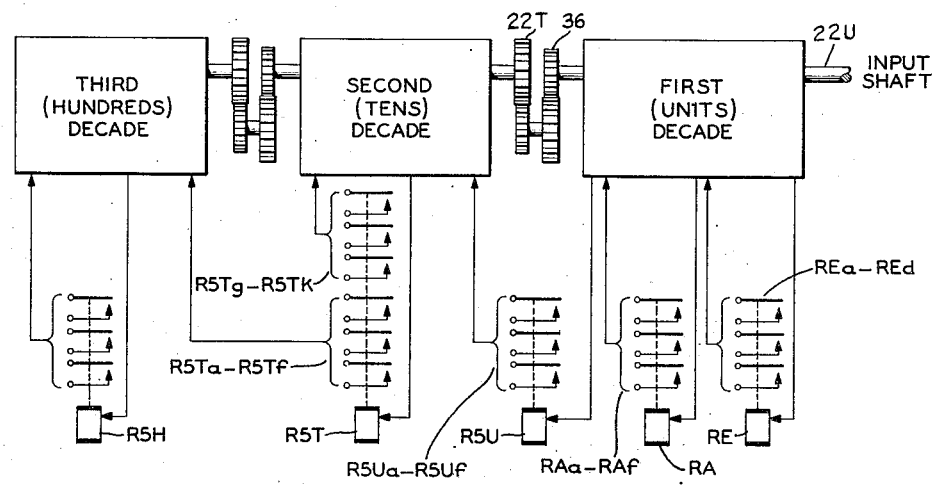
Fig. 3 is a diagrammatic view of a 3-denomination counter embodying my invention.

At the left side of the counter in Fig. 1 there is a 10-to-1 reduction gear 36 for connecting the cam shaft 22U to the shaft 22T of the next higher order counter shown in dotted lines. The interconnection of three single order counters to make a 3-denomination counter is shown in Fig. 3.

Figure 4:
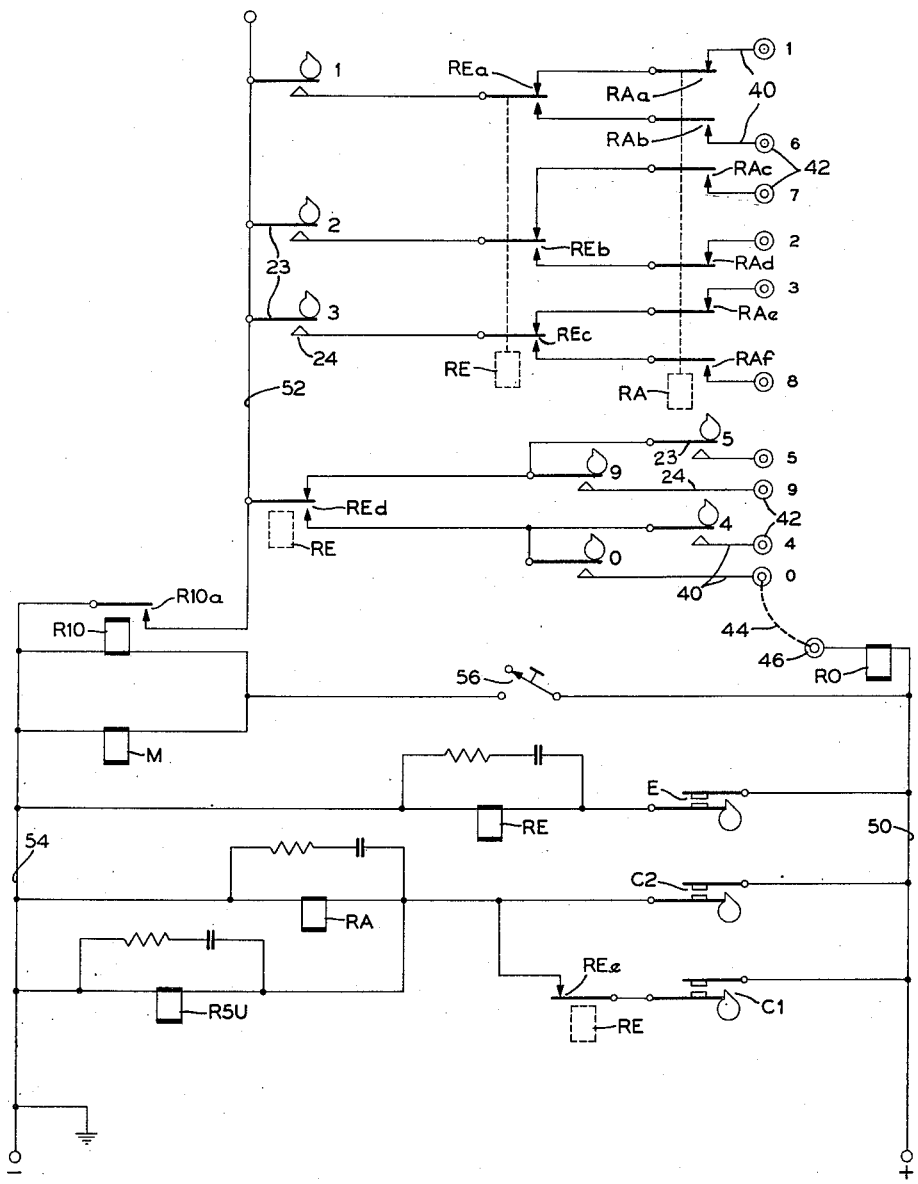
Fig. 4 is a partial circuit diagram of a lowest order counter conforming to Figs. 1 to 3.
Figure 5:
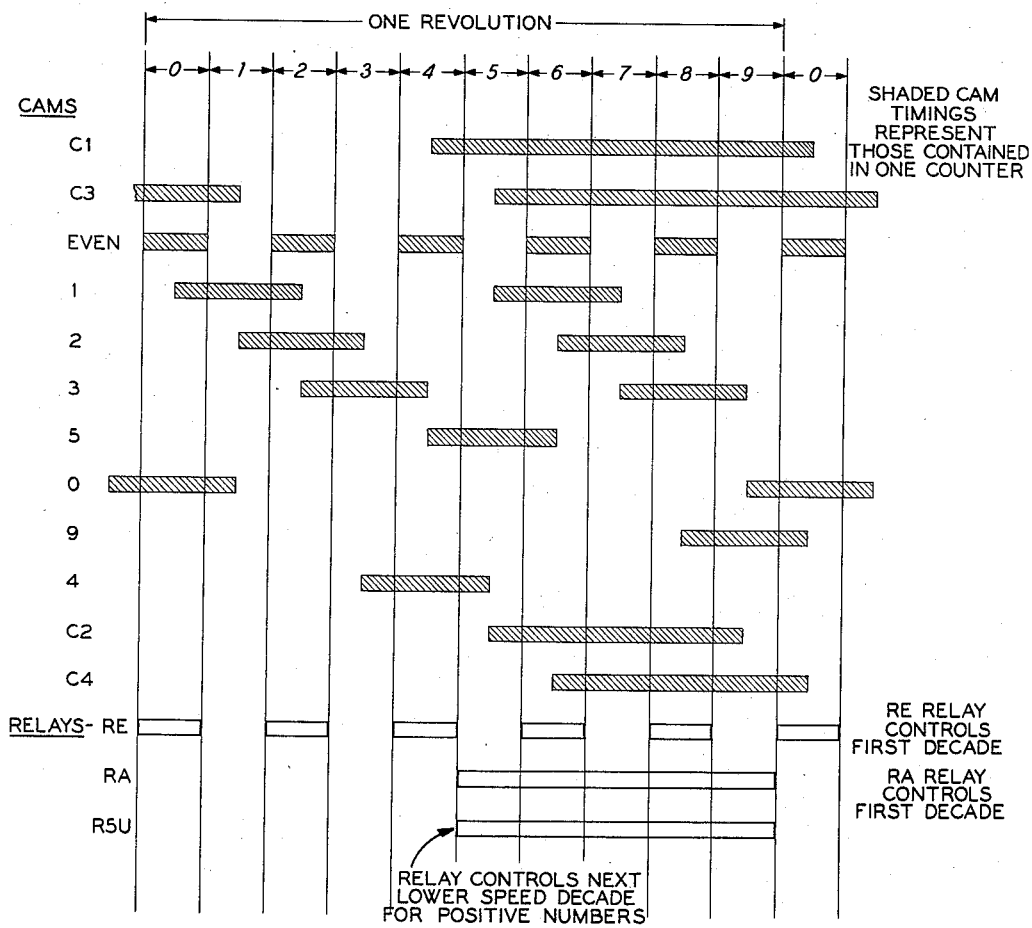
Fig. 5 is a timing diagram of the same lowest order counter.

The configuration of the cams is indicated by the timing diagram, Fig. 5. There are seven digit cams 1, 2, 3, 5, 0, 9, 4, which operate digit contacts (23, 24) identified in the wiring diagram, Fig. 4, by the same numbers, respectively. There are also shown in Fig. 4 portions of ten digit circuits, represented by wires 40 and terminals 42, the digits to which the respective circuits pertain being shown by the numbers at the right side of Fig. 4. The terminals 42 may be connected, as shown for the "0" terminals, by plug wires, such as 44, to respective plug hubs, such as 46, from which a circuit runs through a relay, such as RO to the positive line 50. There may be, for example, ten relays such as RO for each order of the counter, to control respective circuits (not shown) to lamp banks on which the digits read out of the counter shafts 22U are displayed. A typical circuit will be traced presently.

A common wire 52 is connected directly to one terminal of each of the digit contacts 1, 2, and 3; also to the swinger terminal of contacts REd of a relay RE. This relay is called the "even" relay, because it is energized for even digits, by a circuit controlled by the cam contact E, which closes when the shaft 22U is in an even digit position at the time the readout magnet M is energized. The cam contact E remains open when the shaft is in an odd digit position (see Fig. 5). In the normal position of contacts REd a circuit is prepared to the digit contacts 5 and 9, while in the transferred position of contacts REd a circuit is prepared to digit contacts 4 and 0.

The digit circuits 1, 6, 7, 2, 3, and 8, controlled by the digit contacts 1, 2, and 3, are additionally controlled by transfer contacts REa, Reb, and REc, and by contacts RAa to RAf of a relay RA. This relay is energized whenever, at the time the magnet M is operated, the shaft is in a digit position from 5 through 9, as will be evident from an examination of its circuits in Fig. 4 and the timing diagram, Fig. 5. Cams 1, 2, and 3 are double lobed and close their contacts not only in positions 1, 2, and 3 of shaft 22U, but also in positions 6, 7, and 8, respectively.

The common wire 52 can be connected to the negative wire 54 by contacts R10a of a relay R10. This relay has a delayed action, as indicated, for a reason to be explained.

The operation of the lowest order counter will now be explained, with particular reference to Figs. 4 and 5. The shaft 22U, driven by some shaft whose position is to be indicated, has been turning freely, with the readout magnet M de-energized and the cam operating levers 26 held out of contact with the cams on shaft 22U, by retracting bail 32. A readout switch 56 is closed, completing a circuit from line 50 through magnet M to line 54, energizing said magnet. Any automatic switching means may replace the manual switch 56. The retracting bail swings to the left (Fig. 2) and the contact operating levers come to rest on the cams C1–C4.

If the shaft 22U is in the "0" position cam contact E and digit contact 0 will close. The relay RE is energized and all of its contacts REa to REd transfer.

The closure of switch 56 also completes a circuit through relay R10, but this relay is slugged and picks up after magnet M and relay RE have been energized. When contact R10a closes a circuit is completed from line 54 through R10a, wire 52, REd, transferred, the 0 digit contact, the 0 wire 40 and terminal 42, plug wire 44, terminal 46, relay RO, to wire 50, energizing said relay. Relay RO may control any means, such as a lamp bank or any recording means, to indicate or record a zero.

The digit contact 1 may also be closed when the shaft is in position "0," but with REa transferred there is no circuit to terminal 1. Likewise there is no circuit to terminal 6 because of open contact RAb. The digit contact 9 may be closed when the shaft is in another part of position "0" but with REd transferred there is no circuit to terminal 9.

If the shaft 22U is in the "1" position when switch 56 is closed digit contact 1 will be closed. When contact R10a closes a circuit will be completed from wire 54 through R10a, wire 52, digit contact 1, REa, normal, normally closed RAa, the 1 digit wire 40 and terminal 42, thence through a circuit, not shown, to energize a relay representing the value 1.

When the shaft 22U crosses over to position 2, digit contact 1 may still be closed when the test signal is sent through R10a, but now cam contact E will be closed and relay RE energized. The circuit to terminal 1 will be open at REa, but the circuit to terminal 2 will be closed at REb and RAd.

Examination of the branch circuits for each of the other digit positions of the shaft will show that in every case the circuit is closed to one and only one of the terminals 42. The break is made, not by the digit contacts themselves, but by the contacts of the relay RE. Since this relay must be in one condition or the other, there is no ambiguity in the indication of the shaft position.

Cam C2 is closed from digit 5 to 9 time and provides a holding means for the relays RA and R5U during digit time when the contact REe is opened by the relay E. The cams C3 and C4 shown structurally in Figs. 1 and 2 and diagrammatically in Fig. 5 are provided for negative or reverse operation of the counter. Since these latter cams form no part of the invention, for simplicity, the circuits therefor have been deleted from the units counter of the wiring diagram in Fig. 4.

Higher order counters

As previously stated, the higher order counters are driven through reduction gearing from the shafts of their respective adjacent lower order counters. In the lowest order counter the switching action to differentiate adjacent shaft positions was generated internally within the lowest order counter. In each higher order counter this switching action is generated within the next lower order counter and so the chain of control traces back to the lowest order counter.

In the second order counter the digital switching control is performed by contacts of the relay R5U (Fig. 4), which is connected in parallel with relay RA. These relays are de-energized for positions 0 through 4 of the lowest order counter and energized for positions 5 through 9. Relay R5U is therefore de-energized for the first half of each digital position of the shaft 22T and energized for the second half of each digital position, in contrast to the relay RE, which is energized for the even digital positions of shaft 22U and de-energized for the odd digital positions.

In the second order counter the break between each digital position and the next higher one is always indicated by a shift of the switching means (contacts of relay R5U) in the same direction, namely, from transferred to normal position. This calls for a different arrangement of digit cams and digit circuits, which will now be described.

For each digital position 0 through 4 of the shaft 22T there are two double lobed cams, represented in the timing diagram, Fig. 7, as 0A, 0B; 1A, 1B; 2A, 2B; 3A, 3B; and 4A, 4B. The second lobes of these cams pertain to the digits 5 through 9, respectively.

Figure 6:
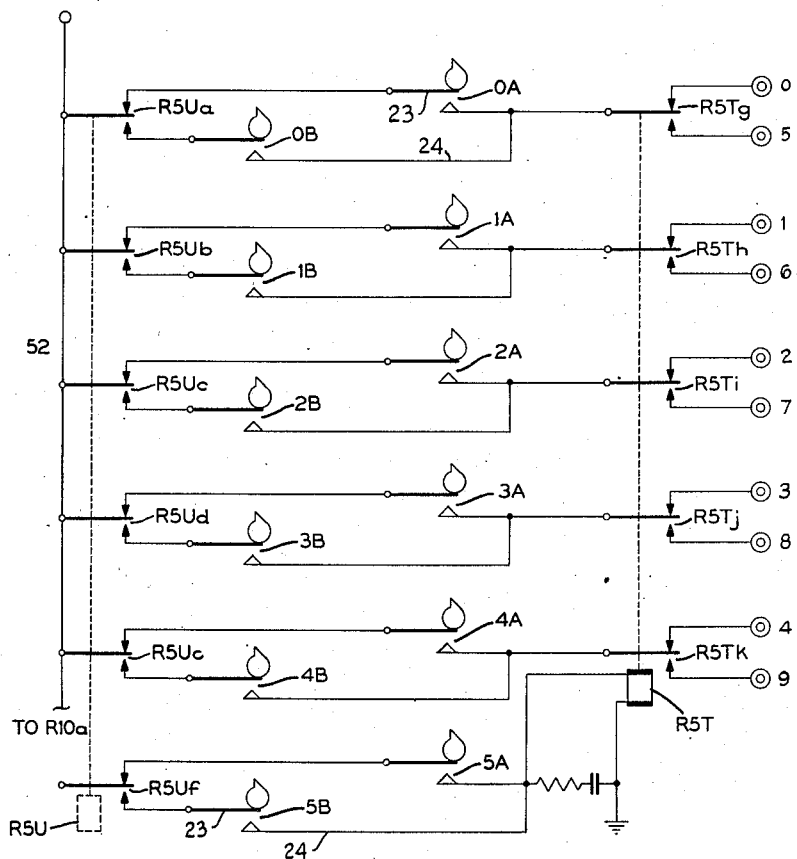
Fig. 6 is a partial circuit diagram of the next higher order counter to Fig. 4.

Referring, now, to the wiring diagram, Fig. 6, the digit contacts 1A and 1B, for example, are, respectively, in two parallel circuits controlled by the relay contacts R5Ub. With the latter contacts in normal position the 1 digit circuit extends through contact 1A and with R5Ub transferred the circuit extends through 1B. When the shaft 22T moves from "0" position into "1" position, 0B and 1A contacts are both closed. The break between the two digit positions of the shaft is decided by the opening of the normally open contacts R5Ua and the closing of the normally closed contacts R5Ub.

The contacts of relay R5U move to the transferred position at the mid-point of each digital position of the shaft 22T. At this time both the A and the B digit contacts are closed, so the transfer has no effect.

Another pair of cam contacts, 5A and 5B control parallel branches of a circuit leading through a relay coil R5T. Transfer contacts R5U*f* cooperate with contacts 5A and 5B to complete a circuit to relay R5T in all digit positions 5 through 9 of shaft 22T and to hold this circuit open in the digit positions 0 through 4. The relay R5T has two functions: Its contacts R5T*g* to R5T*k* control the switching of the digit circuits from the terminals 0 through 4 to the terminals 5 through 9, respectively, in the tens counter. Its contacts R5T*a* to R5T*f* (Fig. 3) have the same function in the hundreds counter as the contacts R5U*a* to R5U*f* have in the tens-counter.

The circuit of each higher order counter is the same as that of the second order counter just described, except that the relay, such as R5H (Fig. 3) corresponding to the relay R5T, will have no contacts to control the switching in a higher order.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device for indicating different digital positions of a shaft, a group of parallel digit circuits, each of said parallel digit circuits comprising two branch circuits, separate digit circuit closing means in each of said parallel circuits selectively operated during a specific digital position of said shaft, said separate digit circuit closing means including two circuit closing means, one in each branch circuit of the parallel digit circuits, digit transition circuit closing means disposed in said parallel digit circuits operative during the transition of said shaft from one digital position to the next, and cams on said shaft operative at selective digit positions of the same for consecutively operating each of said circuit closing means in said branch circuit, the cams associated with each digital position of said shaft being overlapped with each other and with the cams associated with the cams of the adjacent digital positions.

2. A device as specified in claim 1, wherein the digit transition circuit closing means identified with the transition from one digital position of the shaft to the next are adapted to open one of the branches of each digit circuit and to close the other branch, and vice versa, on each change of condition.

3. A multi-order counter comprising a group of single order counters each having a shaft, the shafts being geared together with speed reduction gearing conforming to a predetermined system of notation to define lower and higher order counter shafts, digit cams on each shaft, digit contacts operated by the respective digit cams, digit circuits prepared by respective digit contacts, circuit control means including a relay having relay contacts in the higher order digit circuits controlled by the lower order shaft, said relay having a coil, and a circuit connected to said relay coil having a control contact operated by one of said digit cams on the lower order counter shaft.

4. A multi-order counter as described in claim 3, characterized by the fact that said circuit having the contact for said relay coil is closed for one continuous group of digit positions of the lower order shaft and open for the remaining group.

5. In a counter having a shaft whose positions are to be indicated in digital increments, a number of cams on the shaft each having a plurality of associated lobes located on said shaft in accordance with an arbitrary subdivision to define digital positions on said shaft; digit contacts, one for each cam; a number of terminals corresponding to the number of digital positions of the shaft; and means including switching means for selectively electrically connecting each of said digit contacts to one or another of said terminals, in time with the operation of said digit contacts by the associated lobes on said cams.

6. In a counter having a shaft whose positions are to be indicated in digital increments, a number of terminals corresponding to the number of digital positions of the shaft, said terminals being in two groups, namely, a high number group and a low number group, a number of digit cams equal to half the number of terminals, contact means respectively operated by said digit cams, switching means normally connecting said contact means with respective terminals of one of said groups, and means to operate said switching means to connect said contact means respectively to terminals of the other group when the shaft is in a corresponding part of its cycle.

7. In a counter for indicating different digital positions of a shaft, a common line, parallel circuits pertaining to respective digital positions, each parallel circuit including two branches and switching means to connect said branches alternately to said common line, means to close one branch of each parallel circuit for angular positions of said shaft including more than the lower half of the related digital position and also the higher part of the next lower digital position, means to close the other branch of each parallel circuit for angular positions of said shaft including more than the higher half of the related digital position and also the lower part of the next higher digital position, and means to control the condition of said switching means with reference to the shaft position so that in all parallel circuits concurrently the first mentioned branch circuits are connected to said common wire in all positions of the shaft from the beginning of each digital position to the mid-point thereof and the second mentioned branch circuits are connected to said common wire in all positions of the shaft from the mid-point of each digital position to the end thereof.

8. A counter having a shaft divided into equal circumferential unit areas defining digit positions to indicate digital increments 0 through 9, a number of cams on said shaft, at least some of said cams having lobe portions circumferentially extending beyond the normal units area of an associated units position on said shaft; a plurality of digit position contacts, one for each cam, said digit position contacts being closed by said lobes in a predetermined sequence and whereat more than one of said digit position contacts may be closed during simultaneous portions of the shaft rotation; digit terminals, one for each digit 0 through 9, means for providing pairs of parallel circuits from said terminals to said digit position contacts in a predetermined sequence; a timing cam rotated in synchronism with said shaft; and switch means operated by said timing cam for differentiating between said closed digit position contacts to provide the proper circuit over said parallel circuits to said digit terminals in accordance with the true shaft position.

9. In a counter having a shaft whose rotational positions are to be indicated in digital increments 0 through 9, comprising a number of axially spaced cams on said shaft, at least some of which include a plurality of lobes located in accordance with different digital positions of the shaft, said lobe portions on said cam extending circumferentially beyond their assigned digit positions on the shaft; a plurality of digit position contacts, one for each cam, said digit position contacts being closed by said lobes in a predetermined sequence and whereat more than one of said digit position contacts may be closed during portions of the shaft rotation; digit terminals, one for each digit 0 through 9; means for connecting one or more of said terminals to said digit cams to divide said digit terminals in two groups having lower and higher orders, switch means operative in synchronism with said shaft for alternately connecting said last-named means from the digit position contacts to the terminals of the lower and higher order digits; a timing cam rotated in synchronism with said shaft; and timer switch means operated by said timing cam for differentiating between the closed digit position contacts to complete the circuit to the proper digit terminal in accordance with the true shaft position.

References Cited in the file of this patent

UNITED STATES PATENTS

| | | |
|---|---|---|
| 2,191,567 | Hofgaard | Feb. 27, 1940 |
| 2,490,362 | Lake | Dec. 6, 1949 |
| 2,496,585 | Harper | Feb. 7, 1950 |